(12) United States Patent
Kim

(10) Patent No.: US 8,501,340 B2
(45) Date of Patent: Aug. 6, 2013

(54) BATTERY MODULE HAVING A BUS BAR

(75) Inventor: Yong-Sam Kim, Suwon-si (KR)

(73) Assignees: Samsung SDI Co., Ltd., Yongin-si, Gyeonggi-do (KR); Robert Bosch, GmbH, Stuttgart (DE)

( * ) Notice: Subject to any disclaimer, the term of this patent is extended or adjusted under 35 U.S.C. 154(b) by 614 days.

(21) Appl. No.: 12/659,058

(22) Filed: Feb. 24, 2010

(65) Prior Publication Data

US 2010/0216009 A1    Aug. 26, 2010

(30) Foreign Application Priority Data

Feb. 25, 2009    (KR) .................. 10-2009-0015794

(51) Int. Cl.
*H01M 2/20*    (2006.01)
(52) U.S. Cl.
USPC ............ 429/160; 429/121; 429/158; 439/627
(58) Field of Classification Search
USPC ................. 429/122–347, 121; 439/627
See application file for complete search history.

(56) References Cited

U.S. PATENT DOCUMENTS 5,212,024 A * 5/1993 Klink et al. .................. 429/72

FOREIGN PATENT DOCUMENTS

| JP | 2002-246003 A | 8/2002 |
|---|---|---|
| JP | 2004-031049 A | 1/2004 |
| JP | 2008-091183 A | 4/2008 |
| JP | 2008-186725 A | 8/2008 |
| JP | 2008-235166 A | 10/2008 |

OTHER PUBLICATIONS

Machine translation of JP 2008-091183 originally published to Okada et al. Apr. 2008.*

* cited by examiner

*Primary Examiner* — Basia Ridley
*Assistant Examiner* — Jonathan G Leong
(74) *Attorney, Agent, or Firm* — Lee & Morse, P.C.

(57) ABSTRACT

A battery module includes first supporting members on first terminals of a plurality of batteries, second supporting members on second terminals of the plurality of batteries, the second supporting members having different heights from the first supporting members, and a bus bar that electrically connects a first terminal of a first one of the plurality of batteries to a second terminal of a second one of the plurality of batteries. The bus bar includes a first connection part that is supported on the first supporting member, a second connection part that is supported on the second supporting member, and a third connection part that forms an angle with respect to the first connection part and the second connection part.

12 Claims, 7 Drawing Sheets

BATTERY MODULE HAVING A BUS BAR

BACKGROUND

1. Field

Embodiments relate to a battery module having a plurality of batteries.

2. Description of the Related Art

A high power rechargeable battery may be configured by electrically connecting a plurality of rechargeable batteries, and may be used for purposes requiring large amounts of power, e.g., for driving a motor in an electric vehicle, etc.

The above information disclosed in this Background section is only for enhancement of understanding of the related art and is not an admission of prior art.

SUMMARY

Embodiments are directed to a battery module having a plurality of batteries, which substantially overcome one or more problems arising from the limitations and disadvantages of the related art.

It is therefore a feature of an embodiment to provide a battery module having a plurality of batteries electrically coupled by a bus bar, wherein the battery module is configured to prevent assembly errors.

At least one of the above and other features and advantages may be realized by providing a battery module, including first supporting members on first terminals of a plurality of batteries, second supporting members on second terminals of the plurality of batteries, the second supporting members having different heights from the first supporting members, and a bus bar that electrically connects a first terminal of a first one of the plurality of batteries to a second terminal of a second one of the plurality of batteries. The bus bar may include a first connection part that is supported on the first supporting member, a second connection part that is supported on the second supporting member, and a third connection part that forms an angle with respect to the first connection part and the second connection part.

The third connection part may form a right angle with respect to the first connection part and the second connection part, respectively.

The third connection part may form an obtuse angle with respect to the first connection part and the second connection part.

The first connection part and the second connection part may be formed in parallel with each other The first supporting member may be on a lower end of the first terminal and may have a diameter larger than a diameter of the first terminal.

The second supporting member may be on a lower end of the second terminal and may have a diameter larger than a diameter of the second terminal.

The first supporting member may have a nut shape and the first terminal may have a screw thread to which the first supporting member is coupled.

The second supporting member may have a nut shape and the second terminal may have a screw thread to which the second supporting member is coupled.

The batteries may be rechargeable.

The first terminal of the first one of the plurality of batteries may have an electrical polarity opposite to that of the second terminal of the second one of the plurality of batteries At least one of the above and other features and advantages may also be realized by providing a battery module, including a first supporting member on a terminal of a first battery, a second supporting member on a terminal of a second battery, the second supporting member configured such that an upper surface thereof is offset in a height direction with respect to an upper surface of the first supporting member, and a bus bar that electrically connects the terminal of the first battery to the terminal of the second battery. The bus bar may include a first connection part that is supported on the upper surface of the first supporting member, a second connection part that is supported on the upper surface of the second supporting member, and a third connection part that forms an angle with respect to the first connection part and the second connection part.

At least one of the above and other features and advantages may also be realized by providing a method of assembling a battery module, the method including mounting a first supporting member on a terminal of a first battery, mounting a second supporting member on a terminal of a second battery such that an upper surface of the second supporting member is offset in a height direction with respect to an upper surface of the first supporting member, and electrically connecting the terminal of the first battery to the terminal of the second battery using a bus bar. The bus bar may include a first connection part that is supported on the upper surface of the first supporting member, a second connection part that is supported on the upper surface of the second supporting member, and a third connection part that forms an angle with respect to the first connection part and the second connection part.

BRIEF DESCRIPTION OF THE DRAWINGS

The above and other features and advantages will become more apparent to those of ordinary skill in the art by describing in detail example embodiments with reference to the attached drawings, in which.

DETAILED DESCRIPTION

Figure 1:
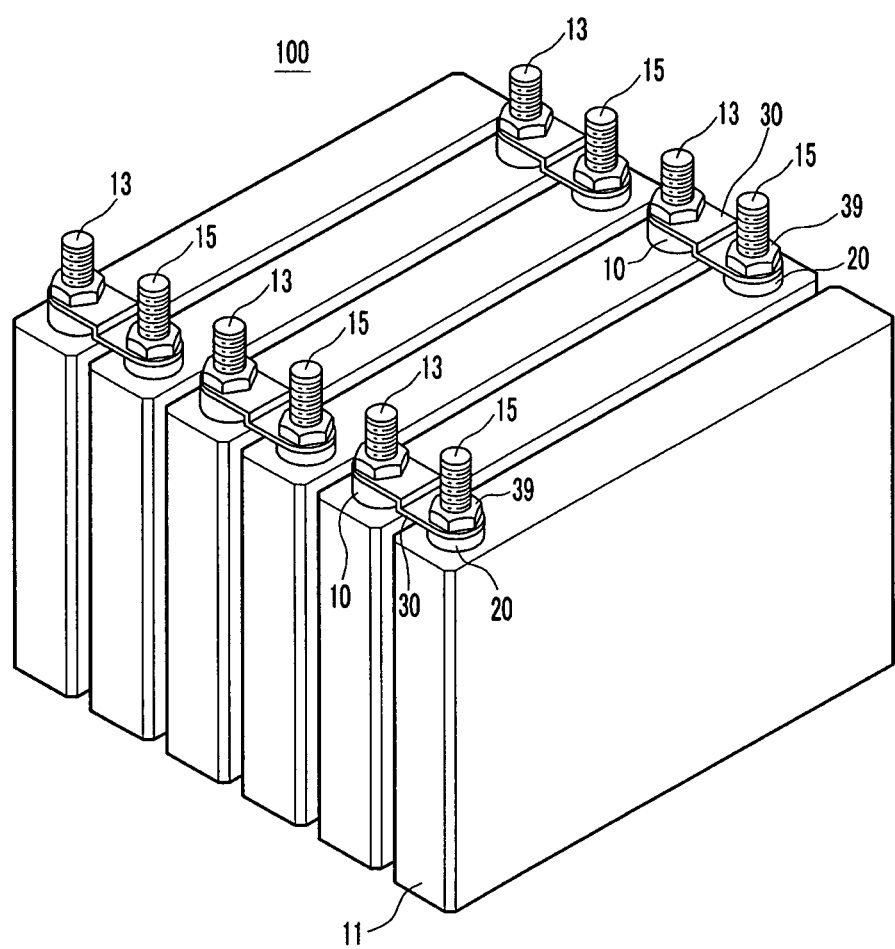
FIG. 1 illustrates a schematic perspective view of a battery module according to a first example embodiment.

Korean Patent Application No. 10-2009-0015794, filed on Feb. 25, 2009, in the Korean Intellectual Property Office, and entitled: "Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawing figures, the dimensions of layers and regions may be exaggerated for clarity of illustration. Like reference numerals refer to like elements throughout.

Description of Reference Numerals Indicating Primary Elements, as Used in the Drawings:

| 10 first supporting member | 11 rechargeable battery |
| 13 positive terminal | 15 negative terminal |
| 20 second supporting member | 30 bus bar |
| 31 first connection part | 33 second connection part |
| 35 third connection part | |

Figure 2:
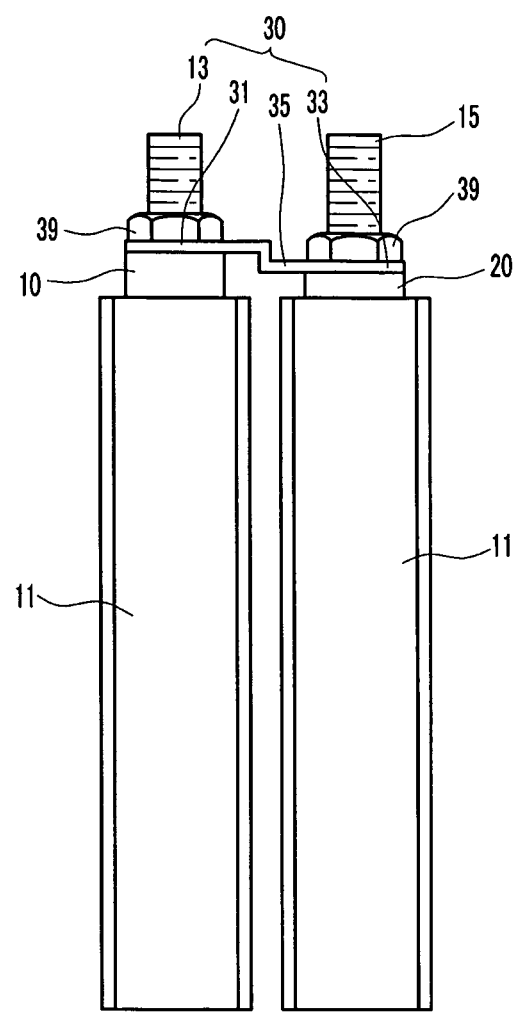
FIG. 2 illustrates a side view showing a state where a positive terminal and a negative terminal are connected to each other by a bus bar in a battery module.
Figure 3:
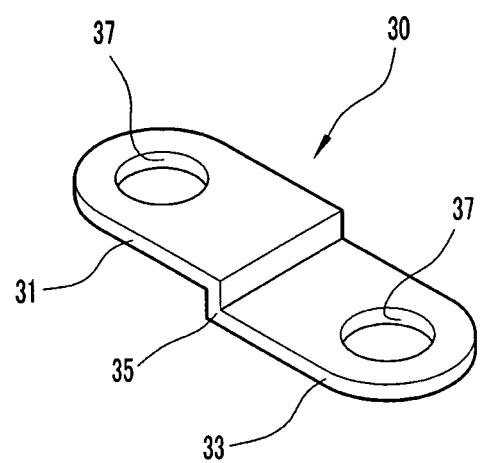
FIG. 3 illustrates is a perspective view of the bus bar of FIG. 2.
Figure 4:
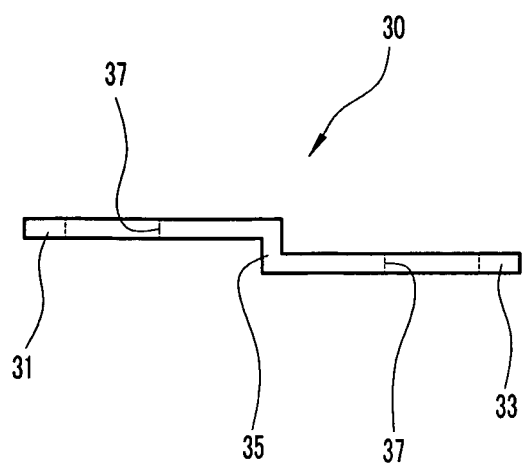
FIG. 4 illustrates a side view of a bus bar of FIG. 2.

FIG. 1 illustrates a schematic perspective view of a battery module 100 according to a first example embodiment. FIG. 2 illustrates a side view showing a state where a positive terminal and a negative terminal are connected to each other by a bus bar in a battery module, FIG. 3 illustrates is a perspective view of the bus bar of FIG. 2, and FIG. 4 illustrates a side view of a bus bar of FIG. 2.

Referring to FIGS. 1 and 2, the battery module 100 according to the first example embodiment may include first supporting members 10 that are mounted on first terminals 13 of rechargeable batteries 11. Further, second supporting members 20 may be mounted on second terminals 15 of the rechargeable batteries 11. In an implementation, tops of the rechargeable batteries 11 may be substantially level with one another, and the first supporting members 10 may have different height from the second supporting members 20, such that the first supporting members 10 and the second supporting members 20 may have different heights from one another. A bus bar 30 may be supported on a first supporting member 10 and on a second supporting member 20, respectively, and may electrically connect a first terminal 13 and a second terminal 15 to one another.

A large-capacity battery module may be usually configured of a plurality of rechargeable batteries 11, which may be connected in series. The rechargeable batteries 11 may be formed in a cylindrical shape, a square shape (prismatic), etc. Positive and negative terminals of the rechargeable batteries 11 in the battery module 100 may be electrically connected to each other through a bus bar to supply power, as described in detail below. The rechargeable batteries 11 may be manually assembled to one another, or automatically assembled to one another by a machine.

In an implementation, the first terminal 13 and the second terminal 15 have different polarities from one another. For example, the first terminal 13 may function as a positive terminal and the second terminal 15 may function as a negative terminal.

Hereinafter, the example embodiments will be described in the context of the first terminal 13 being the positive terminal and the second terminal 15 being the negative terminal. However, this is merely for the sake of convenience, and other configurations may be provided.

Referring to FIGS. 1 to 4, the first supporting member 10 may be mounted on a lower ends of a corresponding positive terminal 13. The first supporting member 10 may have a diameter larger than a diameter of the positive terminal 13. Such a configuration may allow one to easily seat one side of the bus bar 30.

The first and second supporting members 10 and 20 may be formed in a cylindrical shape. However, the shapes thereof are not limited thereto. For example, the first and second supporting members 10 and 20 may be formed in a polygonal shape. The first supporting member 10 and the second supporting member 20 may be formed in a nut shape, such that they can be coupled to the positive terminal 13 and/or the negative terminal 15. In the first example embodiment, the first supporting member 10 and the second supporting member 20 may be formed in a nut form, but are not limited thereto. Further, the first supporting member 10 and the second supporting member 20 may be mounted with a washer, etc.

The positive terminal 13 and/or the negative terminal 15 may be formed with screw threads along an outer circumferential surface thereof, so that the first supporting member 10 and the second supporting member 20 can be coupled to the terminals.

As described above, the first supporting member 10 and the second supporting member 20 may be mounted such that the height therebetween is different.

In the first example embodiment, the first supporting member 10 is shown as being higher than the second supporting member 20. However, the first example embodiment is not limited thereto. In an implementation, the first supporting member 10 may be thicker than the second supporting member 20. In another implementation, the second supporting member 20 may be thicker than the first supporting member 10.

Making the height between the first supporting member 10 and the second supporting member 20 different may help prevent confusing the positive terminal 13 and the negative terminal 15 when the battery module is being assembled. This will be described in detail while describing the bus bar 30.

The bus bar 30 may be mounted between the first supporting member 10 and the second supporting member 20. The bus bar 30 may be electrically conductive and may electrically connect the positive terminal 13 and the negative terminal 15.

The bus bar 30 may electrically connect the positive terminal 13 and the negative terminal 15 to configure a battery module, such that power is supplied to a load (not shown).

The bus bar 30 may include a first connection part 31 that is supported on the first supporting member 10 and electrically connected thereto, a second connection part 33 that is supported on the second supporting member 20 and electrically connected thereto, and a third connection part 35 that electrically connects the first connection part 31 and the second connection part 33 to one another.

The third connection part 35 may be shaped in the form of a right angle with respect to the first connection part 31 and the second connection part 33, respectively. The first connection part 31 and the second connection part 33 may be formed in parallel with each other.

An angle of the third connection part to the first connection part and the second connection part, respectively, may be selected as an angle smaller than 180°, and may be an acute angle or an obtuse angle. An example forming the obtuse angle will be described in the second example embodiment below.

The first connection part 31 may be placed onto the positive terminal 13, such that it is seated on the upper side of the first supporting member 10. Thus, the first connection part 31 may be formed with a through hole 37 that is configured to receive the positive terminal 13.

The second connection part 33 may be placed onto the negative terminal 15, such that it is seated on the upper side of the first supporting member 20. Thus, the second connection part 33 may be formed with a through hole 37 that is configured to receive the negative terminal 15.

The first connection part 31 and the second connection part 33 may be fixed in place with a member 39, e.g., a nut, such that the coupling and electrical connection of the first connection part 31 and the connection part 33 are secured.

A portion of the third connection part 35 may be bent in a length direction to correspond to a height difference between the first supporting member 10 and the second supporting member 20.

In the first example embodiment, a bent position of the third connection part 35 is shown as being located at a central position in a length direction, but embodiments are not limited thereto. For example, a position nearer the first connection part 31 may be bent, or a position nearer the second connection part 33 may be bent.

The bus bar 30 including the first, second, and third connection parts 31, 33, and 35 may be formed as an electrically conductive body to electrically connect the positive terminal 13 and the negative terminal 15.

Each of the first, second, and the third connection parts 31, 33, and 35 may be formed in a plate shape.

According to the foregoing configuration, in a process where a plurality of the rechargeable batteries 11 are connected using a plurality of the bus bars 30, when an order, e.g., a series of (+) (−) (+) (−) connections, of the positive terminal 13 and the negative terminal 15 is not correct due to an error in arranging a rechargeable battery 11, the bus bar 30 may not properly mount on the electrode terminal, such that the assembler will be made aware of the mis-configuration and take corrective action.

Thus, when the order of the positive terminal 13 and the negative terminal 15 of the rechargeable battery 11 is not corrected, the bus bar 30 may not correctly coupled to any one side of the first and second supporting parts 10 and 20 (intentionally), such that the coupling of the bus bar 30 is difficult or impossible when there is a mis-configuration.

As described above, it can be easily confirmed by an assembler if the order of the positive terminal 13 and the negative terminal 15 of the rechargeable battery 11 is not correct, such that the assembler can avoid making an error and a correct mounting of the rechargeable battery 11 can be rapidly made.

Figure 5:
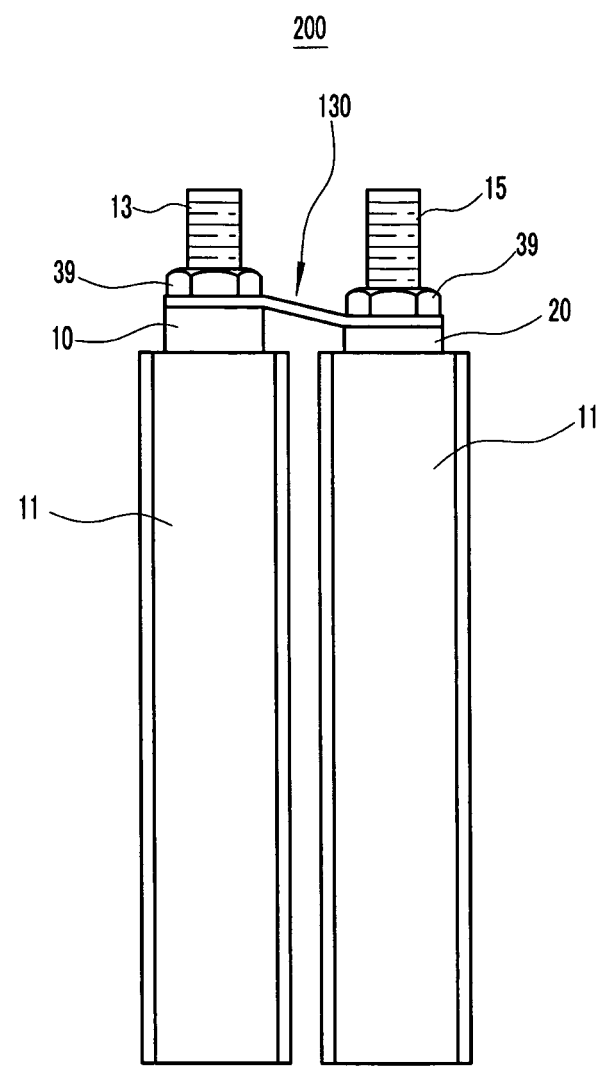
FIG. 5 illustrates a schematic side view of a battery module according to a second example embodiment.
Figure 6:
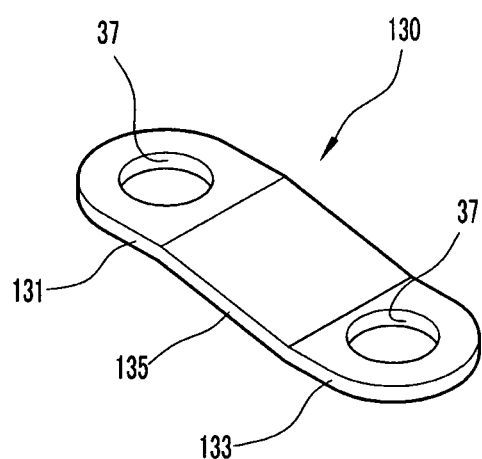
FIG. 6 illustrates a schematic perspective view of the bus bar of FIG. 5.
Figure 7:
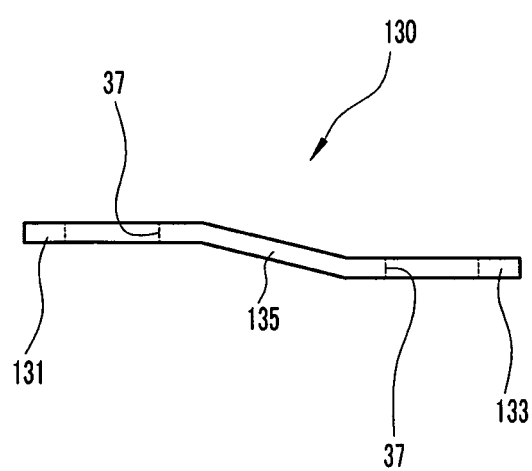
FIG. 7 illustrates a side view of the bus bar of FIG. 5.

FIG. 5 illustrates a schematic side view of a battery module according to a second example embodiment, FIG. 6 illustrates a schematic perspective view of the bus bar of FIG. 5, and FIG. 7 illustrates a side view of the bus bar of FIG. 5. In FIGS. 5-7, like reference numerals to those shown in FIGS. 1 to 4 denote like members having like functions. Further, a detailed description of like reference numerals to those shown in FIGS. 1 to 4 will not be repeated.

Referring to FIGS. 5 to 7, a battery module 200 according to the second example embodiment may include a bus bar 130 that connects the first supporting member 10 and the second supporting member 20. The bus bar 130 may include a first connection part 131, a second connection part 133, and a third connection part 135.

One side of the third connection part 135 may be connected to the first connection part 131 and the other side thereof may be connected to the second connection part 133. The third connection part 135 may be formed inclined between the first connection part 131 and the second connection part 133.

The third connection part 135 may be mounted to have an inclined angle and a length that correspond to a height difference between the first connection part 131 and the second connection part 133. Therefore, when an error of the assembling order between the rechargeable batteries 11 occurs, the bus bar 30 may not be mounted between the positive terminal 13 and the negative terminal 15. Accordingly, it may be possible to prevent an assembly error of the electrode connection between the rechargeable batteries 11.

Example embodiments have been disclosed herein, and although specific terms are employed, they are used and are to be interpreted in a generic and descriptive sense only and not for purpose of limitation. For example, whereas single connection parts are described above, multiple connection parts may be used in combination. Accordingly, it will be understood by those of ordinary skill in the art that various changes in form and details may be made without departing from the spirit and scope of the present invention as set forth in the following claims.

What is claimed is:

1. A battery module, comprising:
   first supporting members on first terminals of a plurality of batteries;
   second supporting members on second terminals of the plurality of batteries, the second supporting members having different heights from the first supporting members, the heights of the first supporting members and second supporting members being distances from top sides of the respective ones of the plurality of batteries to upper surfaces of the first supporting members and second supporting members, respectively; and
   a bus bar that electrically connects a first terminal of a first one of the plurality of batteries to a second terminal of a second one of the plurality of batteries, wherein:
   the bus bar includes a first connection part that is supported on the first supporting member, a second connection part that is supported on the second supporting member, and a third connection part that forms an angle with respect to the first connection part and the second connection part.

2. The battery module as claimed in claim 1, wherein the third connection part forms a right angle with respect to the first connection part and the second connection part, respectively.

3. The battery module as claimed in claim 1, wherein the third connection part forms an obtuse angle with respect to the first connection part and the second connection part.

4. The battery module as claimed in claim 1, wherein the first connection part and the second connection part are formed in parallel with each other.

5. The battery module as claimed in claim 1, wherein the first supporting member is on a lower end of the first terminal and has a diameter larger than a diameter of the first terminal.

6. The battery module as claimed in claim 1, wherein the second supporting member is on a lower end of the second terminal and has a diameter larger than a diameter of the second terminal.

7. The battery module as claimed in claim 1, wherein the first supporting member has a nut shape and the first terminal has a screw thread to which the first supporting member is coupled.

8. The battery module as claimed in claim 1, wherein the second supporting member has a nut shape and the second terminal has a screw thread to which the second supporting member is coupled.

9. The battery module as claimed in claim 1, wherein the batteries are rechargeable.

10. The battery module as claimed in claim 1, wherein the first terminal of the first one of the plurality of batteries has an electrical polarity opposite to that of the second terminal of the second one of the plurality of batteries.

11. A battery module, comprising:
    a first supporting member on a terminal of a first battery;
    a second supporting member on a terminal of a second battery, the second supporting member being configured such that an upper surface thereof is offset in a height direction with respect to an upper surface of the first supporting member; and a bus bar that electrically connects the terminal of the first battery to the terminal of the second battery, wherein:

top sides of the first battery and second battery are substantially level with one another, and the first supporting member and the second supporting member have different heights from the top sides of the first battery and the second battery, respectively, and the bus bar includes a first connection part that is supported on the upper surface of the first supporting member, a second connection part that is supported on the upper surface of the second supporting member, and a third connection part that forms an angle with respect to the first connection part and the second connection part.

12. A method of assembling a battery module, the method comprising:

mounting a first supporting member on a terminal of a first battery;

mounting a second supporting member on a terminal of a second battery such that an upper surface of the second supporting member is offset in a height direction with respect to an upper surface of the first supporting member, the first supporting member and the second supporting member having different thicknesses in the height direction; and electrically connecting the terminal of the first battery to the terminal of the second battery using a bus bar, wherein:

the bus bar includes a first connection part that is supported on the upper surface of the first supporting member, a second connection part that is supported on the upper surface of the second supporting member, and a third connection part that forms an angle with respect to the first connection part and the second connection part.

* * * * *